United States Patent
Vaessen et al.

(10) Patent No.: US 6,301,536 B1
(45) Date of Patent: Oct. 9, 2001

(54) METHOD AND APPARATUS FOR DETECTING A VEHICLE ROLLOVER

(75) Inventors: Radboud Vaessen, Ann Arbor; Canice Patrick Boran, Livonia; Thomas Malbouef, Gross Pointe, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/443,275

(22) Filed: Nov. 18, 1999

(51) Int. Cl.⁷ ..................................................... B60R 21/32
(52) U.S. Cl. .................. 701/45; 701/46; 701/47
(58) Field of Search ..................... 701/45, 1, 46, 701/47; 340/440; 280/734, 735

(56) References Cited

U.S. PATENT DOCUMENTS

| | | |
|---|---|---|
| 5,602,734 | 2/1997 | Kithil ....................................... 701/45 |
| 5,610,575 | 3/1997 | Gioutsos ................................. 340/429 |
| 5,825,284 * | 10/1998 | Dunwoody et al. ................. 340/440 |
| 5,890,084 | 3/1999 | Halasz et al. ........................... 701/45 |
| 6,002,975 * | 12/1999 | Schiffmann et al. .................. 701/36 |
| 6,038,495 * | 3/2000 | Schiffmann ............................. 701/1 |
| 6,055,472 * | 4/2000 | Breunig et al. ........................ 701/45 |

* cited by examiner

Primary Examiner—William A. Cuchlinski, Jr.
Assistant Examiner—Marthe Marc-Coleman

(57) ABSTRACT

A rollover detection system or apparatus 10 deployed on a vehicle 30. Apparatus 10 includes a controller 12 having a memory unit 14 and operating under stored program control. Controller 12 is electrically, physically, and communicatively coupled to sensors 16, 18, 20, and to vehicle occupant safety devices or assemblies 22, 24 by use of a communications bus or path 26. Controller 12 receives signals generated by sensors 16–20, processes and utilizes the received signals to determine when a vehicle rollover situation is imminent or relatively certain to occur, and selectively activates safety devices 22, 24, if such a determination is made.

19 Claims, 4 Drawing Sheets

METHOD AND APPARATUS FOR DETECTING A VEHICLE ROLLOVER

FIELD OF THE INVENTION

This invention relates to a method and an apparatus for detecting a vehicle rollover and more particularly, to a method and an apparatus which reliably detects the onset of a vehicle rollover and which activates one or more vehicle safety devices in response to such a detection.

BACKGROUND OF THE INVENTION

Safety devices such as and without limitation inflatable restraint assemblies, seat belts, and rollover bars are used within vehicles to reduce the likelihood of injury to occupants of the vehicle in the event of a vehicle rollover or collision. It is desirable to determine when a vehicle rollover is imminent or relatively certain to occur so that these safety devices can be selectively activated or engaged prior to or substantially contemporaneous with the occurrence of a rollover in order to protect the occupants of the vehicle; and to substantially prevent and/or reduce the likelihood of an unnecessary activation since many of these devices must be replaced after they have activated, resulting in a significant expense and an annoyance to a vehicle owner.

For example and without limitation, inflatable restraint assemblies, commonly referred to as "air bags" or "curtains", are typically deployed within a vehicle and selectively and inflatably expand into the passenger compartment of the vehicle when the vehicle is struck by or collides with another vehicle or object, and/or "rolls over". These expandable assemblies provide some protection of the vehicle's occupants from injury by protecting the occupants from impacting or "crashing into" the dashboard, windshield, and/or various other portions of the vehicle, and/or from being launched from the vehicle. In order for a vehicle's air bags to provide this desired protection, the air bags must be activated or inflated by way of a pyrotechnic charge or device prior to and/or substantially contemporaneous with the vehicle rolling over.

Vehicle safety belt pretensioning devices or "pretensioners" tighten, lock, and/or remove slack within the vehicle's seat belts during a collision or rollover. These devices must be activated substantially before the vehicle rolls over in order to allow the seat belts to properly restrain the occupants of the vehicle, and to protect the occupants from striking or impacting objects or structures within the vehicle such as the windshield, windows, roofline, or steering wheel, and/or from being launched from the vehicle.

Efforts have been made to detect when a vehicle rollover situation is imminent or relatively certain to occur, and to activate the appropriate safety devices (e.g. the air bags and/or seat belt pretensioners) upon such a detection. Some prior efforts include measuring and/or monitoring the vehicle's acceleration in various directions and/or the angle of the vehicle with respect to the road surface. One drawback associated with these types of prior systems is that they do not adequately ensure that the inflatable devices become energized only when they are actually needed. As such, many of these prior devices activate unnecessarily (e.g., when a rollover is not imminent or relatively certain to occur), and therefore must be replaced or "reset" which, as previously explained, results in an unnecessary and a relatively significant expense to the owner of the vehicle. Furthermore, many of these devices do not account for the fact that vehicles are generally more likely to roll over with a lesser rate of angular variation if the vehicle is already disposed at a certain angle from the road surface. Hence, these devices often do not activate in time to provide the desired protection of the vehicle occupants.

Applicant's invention addresses these drawbacks and provides a method and an apparatus for detecting a vehicle rollover which employs multiple sensors to gather data relating to the acceleration and/or rate of angular change of the vehicle in multiple directions; which analyzes the data to determine whether a vehicle rollover situation is imminent or relatively certain to occur; and which selectively and reliably activates one or more vehicle safety devices in response to the detection of a rollover situation.

SUMMARY OF THE INVENTION

It is a first object of the invention to provide a method and an apparatus for detecting a vehicle rollover which overcomes at least some of the previously delineated drawbacks of the prior systems, devices, and/or methods.

It is a second object of the invention to provide a method and an apparatus for detecting a vehicle rollover which utilizes multiple sensors to determine whether a vehicle rollover is imminent or relatively certain to occur.

It is a third object of the invention to provide a method and an apparatus which reliably determines when a vehicle rollover is imminent or relatively certain to occur and which selectively activates one or more vehicle safety devices in response to such a determination.

It is a fourth object of the invention to provide a method and apparatus for detecting a vehicle rollover which substantially prevents the unnecessary or "false" activation of the vehicle's safety devices.

According to one aspect of the present invention an apparatus for detecting the onset of a vehicle rollover is provided. The apparatus includes at least one sensor which measures lateral and vertical acceleration values and an angular rate of the vehicle, and which generates a data signal based upon the measured lateral and vertical acceleration values and the angular rate. A controller is communicatively coupled to the at least one sensor and receives the data signal, and detects the onset of the vehicle rollover by use of the data signal.

According to a second aspect of the present invention, a method for detecting if a vehicle rollover is imminent is provided. The vehicle is of the type having a safety device, and is disposed upon a first surface at an angle which changes at a certain rate. The vehicle further has a lateral and a vertical acceleration. The method includes the steps of: providing at least one sensor assembly for measuring the value of the lateral and the vertical acceleration; measuring the certain rate; estimating the angle; comparing the measured angular rate to a first threshold value; calculating a second threshold value based upon the measured value of the lateral acceleration and the estimated angle; comparing the certain rate to the second threshold value; calculating an offset value; comparing the offset value to a third threshold value; comparing the measured value of the vertical acceleration to a fourth threshold value; and activating the safety device if the first, the second, the third and the fourth threshold values have been exceeded.

Further objects, features, and advantages of the invention will become apparent from the following detailed description of the preferred embodiment of the invention and by reference to the following drawings.

BRIEF DESCRIPTION OF THE DRAWINGS

For a fuller and more complete understanding of the nature and the objects of the present invention, reference should now be had to the accompanying drawings in which.

DETAILED DESCRIPTION OF THE PREFERRED EMBODIMENT OF THE INVENTION

Figure 1:
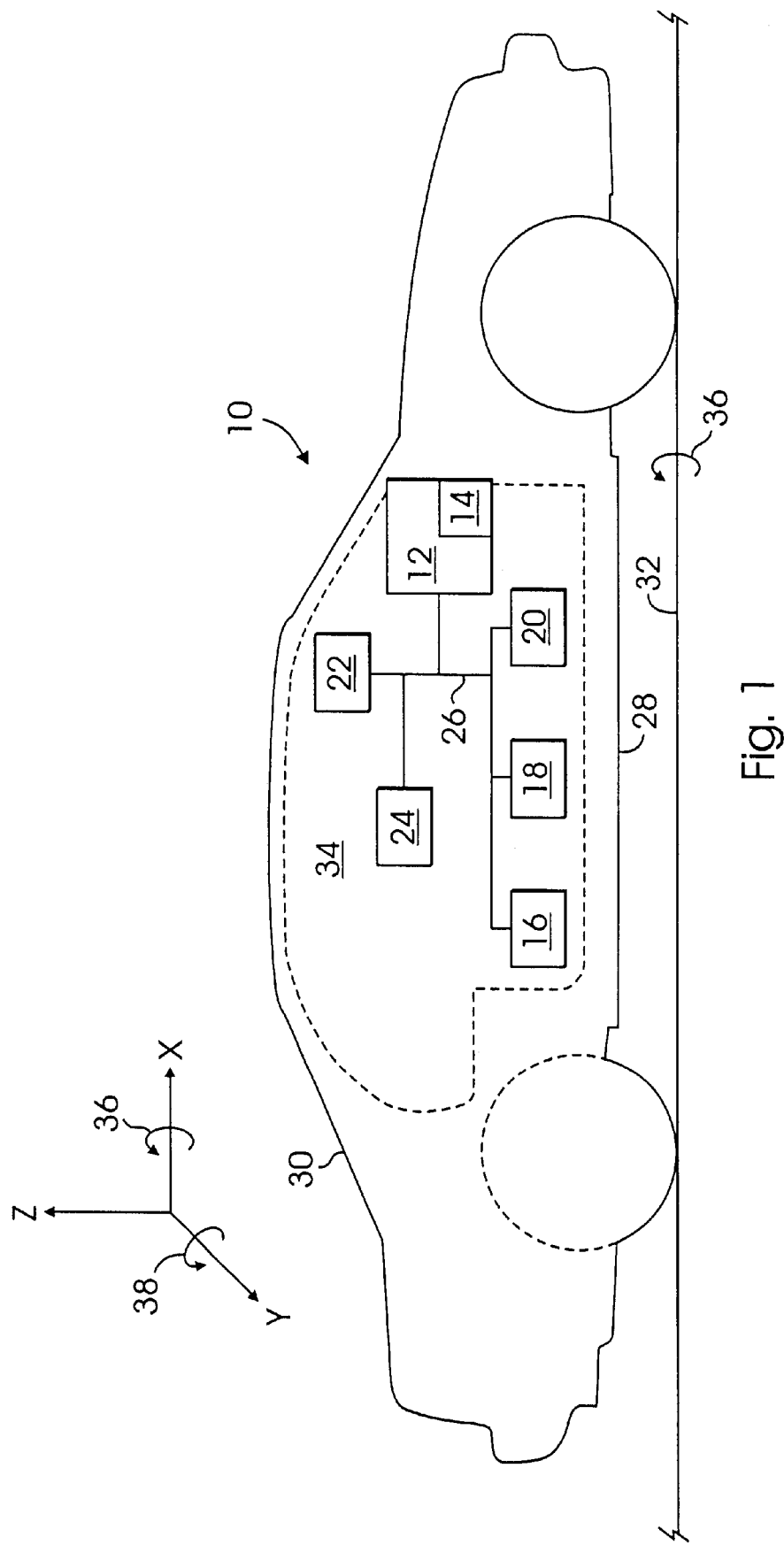
FIG. 1 is a block diagram of an apparatus for detecting a vehicle rollover incorporating the teachings of the preferred embodiment of the invention and deployed on a vehicle.

Referring now to FIG. 1, there is shown a rollover detection system or apparatus 10 deployed on a vehicle 30 and made in accordance with the teachings of the preferred embodiment of the invention. As shown, apparatus 10 includes a conventional microprocessor, microcontroller or controller 12 having a memory unit 14 and operating under stored program control. Controller 12 is electrically, physically, and communicatively coupled to sensors 16, 18, 20, and to vehicle occupant safety devices or assemblies 22, 24 by use of a communications bus or path 26. As described more fully and completely below, controller 12 receives signals generated by sensors 16–20, processes and utilizes the received signals to determine when a vehicle rollover situation is imminent or relatively certain to occur, and selectively activates safety devices 22, 24 if such a determination is made, thereby protecting the vehicle's occupants from harm and/or injury.

In the preferred embodiment, controller 12 may include one or more conventional and/or commercially available microprocessors and/or one or more application specific integrated circuits ("ASICs") which perform one or more of the below-described calculations, algorithms, and/or processes. In the preferred embodiment of the invention, memory 14 is a conventional memory unit including both permanent and temporary memory, and is adapted to and does store at least a portion of the operating software which directs the operation of controller 12. Moreover, memory 14 is also adapted to selectively store other types of data or information, including information associated with the operation of the preferred embodiment of the invention and/or associated historical data, processing data, and/or operational data. As will be more fully discussed below, examples of such data include, but are not limited to, data defining current "threshold" values, angles, angular rates of change, accelerations, constants and modifiers used by controller 12 to determine whether vehicle 30 is relatively certain to rollover (i.e., to detect the onset of a rollover). Moreover, as should also be apparent to those of ordinary skill in the art, controller 12 and memory 14 may actually comprise a plurality of commercially available, conventional, and disparate chips or devices, which are operatively and communicatively linked in a cooperative manner.

Sensors 16–18 comprise a plurality of conventional and commercially available sensors (e.g., accelerometers) which measure certain information pertaining to the acceleration and/or the angular rate of change of vehicle 30 in various directions. More particularly, in the preferred embodiment of the invention, sensor 16 measures the angular rate of vehicle 30 around the longitudinal axis (i.e., the rate of change of the angle 36 of vehicle 30 around the "X-axis"); sensor 18 measures the lateral acceleration of vehicle 30 (i.e., acceleration along the "oY-axis"); and sensor 20 measures the vertical acceleration of vehicle 30 (i.e., acceleration along the "Z-axis"). Sensor 16 performs the aforedelineated measurements with respect to the bottom or floor 28 of vehicle 30 relative to the road surface 32. Sensors 16–20 provide data representing the above-delineated measured values to controller 12, which utilizes these values, in a known and conventional manner, to estimate the angle of the vehicle 30 (or the bottom surface 28 of vehicle 30) relative to the road surface 32 and to determine the acceleration of the vehicle in each of the X, Y and Z axes.

It should be appreciated that sensors 16–20 may include filtering and/or processing devices or circuits (e.g., low pass, high pass, and/or band pass filters) which filter and/or process the measured or sensed data prior to sending the data to controller 12. In other alternate embodiments, sensors 16–20 may each comprise a plurality of sensors, or may collectively comprise a single sensor for measuring acceleration and/or angular disposition in each of the X, Y, and Z axes.

Safety devices or assemblies 22, 24 each comprise one or more conventional and commercially available safety devices disposed within and/or around the passenger compartment 34 of vehicle 30. In the preferred embodiment of the invention, assembly 22 includes one or more selectively expandable/inflatable devices or assemblies, such as a conventional and commercially available "air bag" or "curtain" assembly. Device 24 includes one or more conventional and commercially available seat belt pretensioning mechanisms or "pretensioners" which selectively tighten, lock, and/or remove slack within the seat belts (not shown) of vehicle 30. Assemblies 22, 24 are selectively activated in response to the receipt of one or more control signals or "rollover detection" signals from controller 12. In other alternate embodiments different or additional safety devices are communicatively coupled to and are selectively activated by controller 12, such as a rollover bar, vehicle door locking mechanisms, hazard lights, a fuel "cutoff" assembly, and/or a cellular telephone.

In the preferred embodiment of the invention the operative functionality of the system is achieved by the use of certain software and/or firmware operatively stored within apparatus 10 and more particularly, within memory unit 14 and/or within controller 12.

Figure 2:
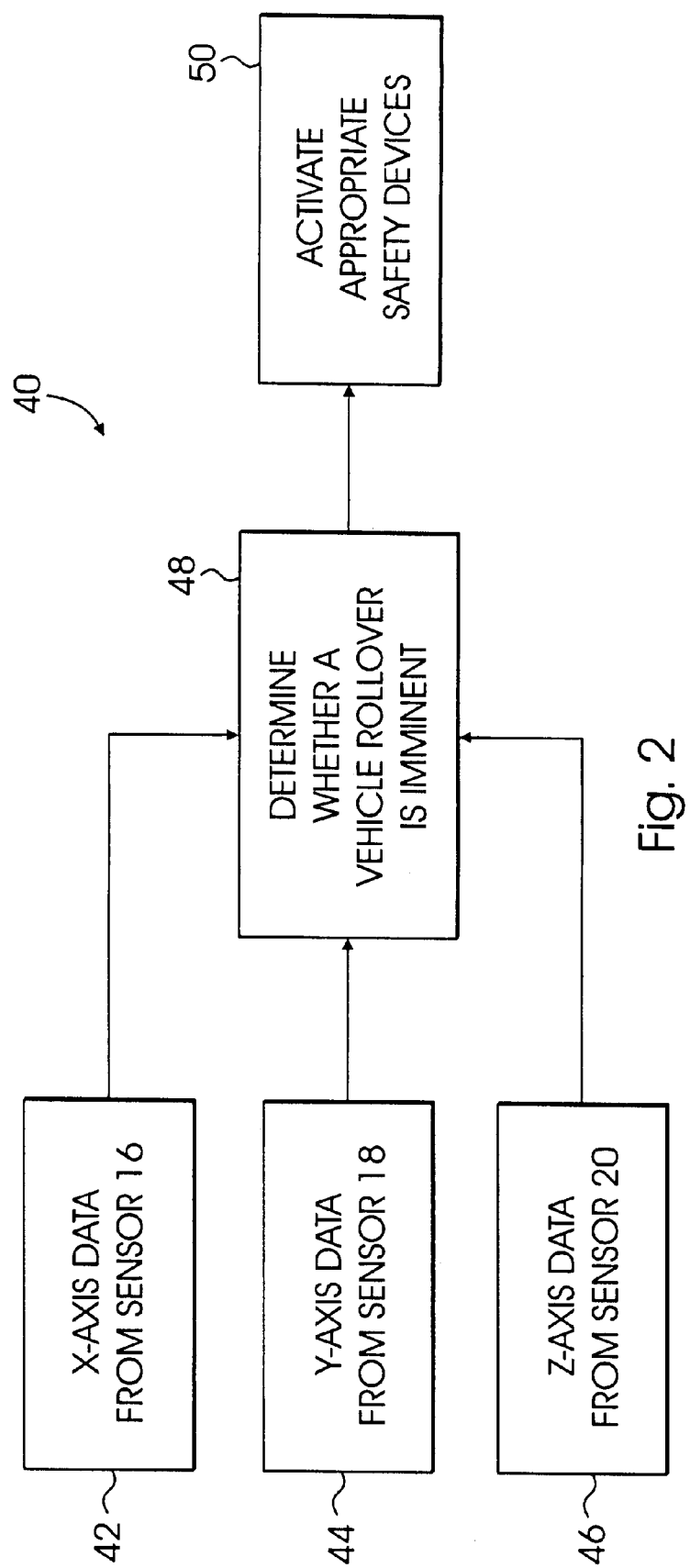
FIG. 2 is a block diagram illustrating the broad functionality of the apparatus shown in FIG. 1.

To understand the general operation of apparatus 10, reference is now made to flow chart 40 of FIG. 2, illustrating the broad functionality of apparatus 10. As shown, data 42 represents the angular rate of the vehicle's floor 28 relative to the road surface 32 about the "X-axis", which is measured and/or processed by sensors 16. Data 42 is communicated from sensors 16 to controller 12 by way of bus 26. Controller 12 processes data 42 and uses conventional algorithms and/or equations to determine or estimate the angle 36 of the vehicle's floor relative to road surface 32 about the longitudinal axis (i.e., about the X-axis) and the rate of change of angle 36.

Data 44 represents the acceleration of the vehicle's floor 28 with respect to the road surface 32 along the "Y-axis" (i.e., the lateral acceleration of vehicle 30), which is measured and/or processed by sensors 18. Data 44 is communicated from sensors 18 to controller 12 by way of bus 26.

Data 46 represents the acceleration of the vehicle's floor 28 with respect to the road surface 32 along the "Z-axis" (e.g., the vertical acceleration of the vehicle), which is measured and/or processed by sensors 20. Data 46 is communicated from sensors 16 to controller 12 by way of bus 26.

As illustrated in block 48 and as discussed more fully and completely below, controller 12 utilizes data 42–46 to determine whether vehicle 30 is about to rollover (i.e., whether a rollover is imminent or relatively certain to occur). If controller 12 determines that a rollover is imminent or relatively certain to occur, controller 12 activates safety devices 22, 24, thereby protecting the occupants of vehicle 30, as shown in block 50.

Figure 3:
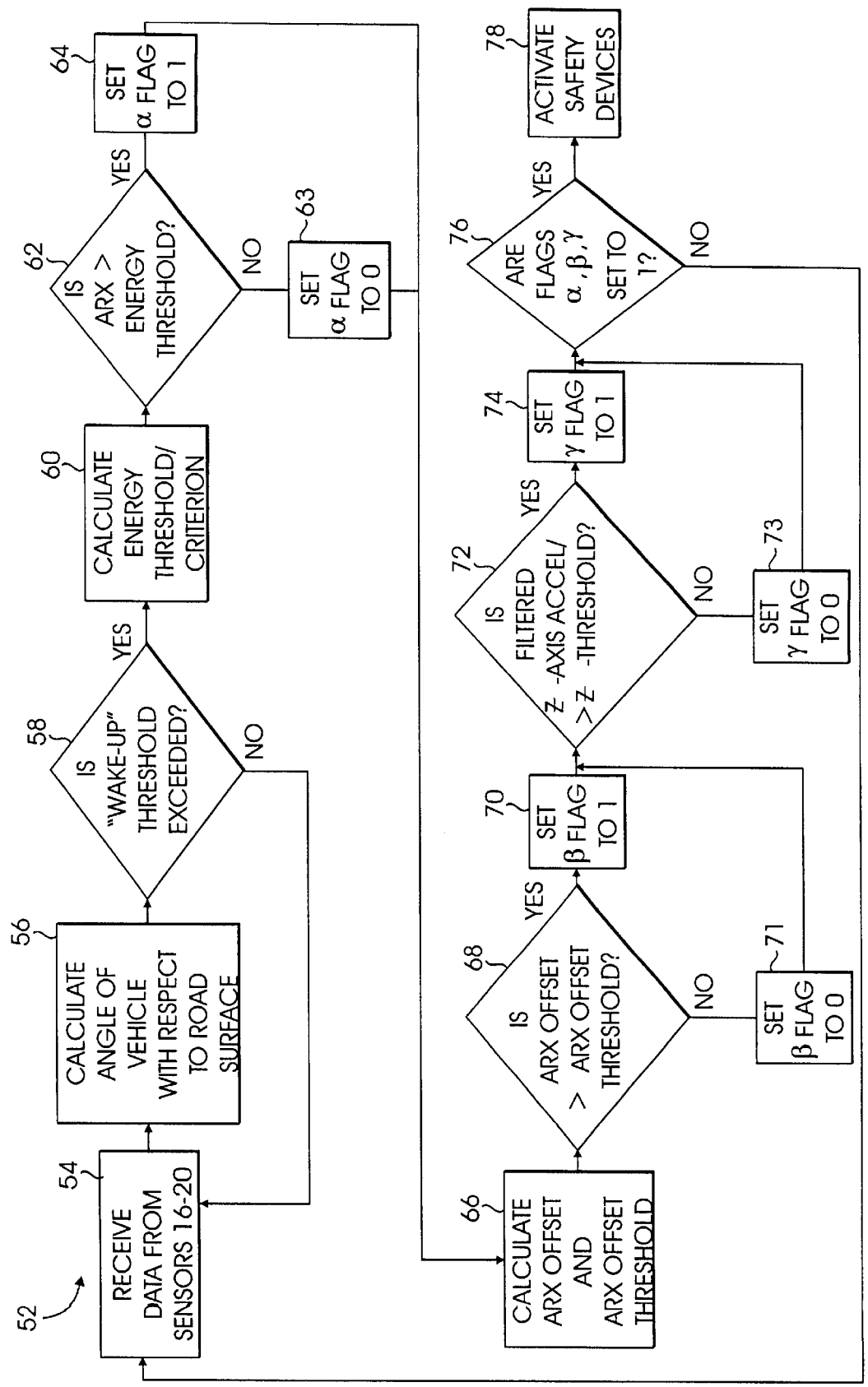
FIG. 3 is a block diagram illustrating the detailed operational functionality of the apparatus shown in FIG. 1.

To more fully understand the operational functionality of the preferred embodiment of apparatus 10, reference is now made to the operational flow diagram or "flow chart" 52 of FIG. 3. As shown in block 54 of flow diagram 40, system 10 receives data from sensors 16–20 (e.g., data 42–46). In block 56, controller 12 filters and/or processes the received data 42–46 in a conventional manner (e.g., using conventional signal processing algorithms) to determine the angle of the vehicle 30 (and/or the bottom 28 of vehicle 30) relative to the road surface 32 around the X-axis (i.e., angles 36). In one non-limiting alternate embodiment, a separate sensor (not shown) may be employed to provide the angle 38 of the vehicle 30 relative to road surface 32 around the Y-axis, thereby allowing assembly 10 to sense a rollover or "pitch-over" of vehicle 30 around the Y-axis. Calculated or estimated angle 36 (and/or angle 38) is stored within a table or matrix in memory 14. In other alternate embodiments, the steps of block 56 may be performed after or contemporaneously with the steps of block 58.

In block 58, controller 12 compares the angular rate of the vehicle around the "X-axis" (e.g. the rate of change of angle 36) to a predetermined "wake-up threshold" which represents angular rate values with respect to the X-axis above which a vehicle rollover is relatively likely to occur. In the preferred embodiment of the invention, the current angular rate must exceed the threshold to proceed to step 60. In other alternate embodiments, the angular rates around both the "X" and "Y" axis must exceed their respective thresholds for apparatus 10 to proceed to step 60.

If the measured angular rate does not exceed the "wake-up threshold", apparatus returns to block 54 and receives the next set of data 42–46 from sensors 16–20. In one non-limiting embodiment of the invention, controller 12 accesses and/or receives new data 42–46 once every millisecond and repeats the procedure illustrated in flow chart 52. If one or both of the "wake-up" thresholds is exceeded, controller 12 proceeds to block 60 and calculates an "Energy Criterion" or an "Energy Threshold".

Figure 4:
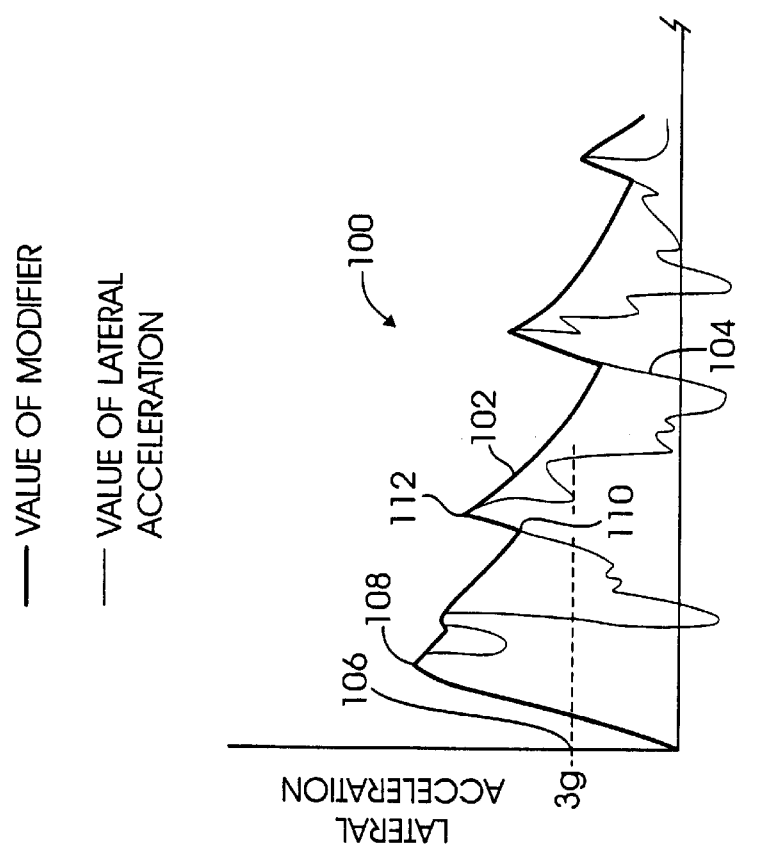
FIG. 4 is a graph of lateral acceleration versus time.

Particularly, the Energy Criterion is calculated by way of the following equation:

Energy Criterion (or Energy Threshold)=$K1+(K2 \times \text{angle } 38)+(K3 \times \text{Modifier})$; (Eq. 1)

where K1, K2 and K3 represent unique and predetermined constants which are stored within memory 14 (in one non-limiting embodiment, K1=244 degrees/second, K2=−4, and K3=−10); angle 36 represents the value of the present calculated angle of the vehicle 30 about the x-axis; and the "Modifier" is equal the present "modified" or adjusted value of the lateral acceleration of the vehicle 30 (i.e., the acceleration component in the "Y" direction or along the Y-axis). Particularly, the value of the Modifier at any given time is calculated using a standard "envelope detecting" circuit, function, and/or algorithm, an example of which is illustrated in graph 100 of FIG. 4.

As shown, curve 102 represents the value of the Modifier, and curve 104 represents the measured value of the acceleration of vehicle 30 in the "Y" direction (i.e., the lateral acceleration of vehicle 30). The Modifier equals to the value of the lateral acceleration until the lateral acceleration exceeds a predetermined acceleration threshold value (e.g. value 106), which in one non-limiting embodiment is equal to 3 "Gs" (or three times the gravitational constant of the earth). At such time, the Modifier continues to be equal to the measured lateral acceleration until the lateral acceleration reaches a peak value and begins to decrease (e.g. at point 108 of graph 100). Once the value of the lateral acceleration begins to decrease, the value of the Modifier does not equal the measured lateral acceleration, but rather decays or decreases exponentially as shown by curve 102. The Modifier, in one non-limiting embodiment, is equal to this exponentially decreasing value (or an inverse squared function) until this value becomes equal to the measured value of lateral acceleration (e.g. at point 110 of graph 100). At such time, the Modifier will again be equal to the measured value of lateral acceleration until another peak is reached (e.g. at point 112 of graph 100). The value of the Modifier then decays or decreases exponentially as shown in graph 100. The value of the Modifier exponentially decays after each peak as illustrated by graph 100 until it falls below the threshold value 106, at which time the above-described method of calculating the Modifier is repeated.

Once the Energy Criterion has been calculated by way of Eq. 1, apparatus 10 proceeds to block 62, where the current angular rate of vehicle 30 about the X-axis (e.g. the rate of change of angle 36) is compared to the current calculated Energy Criterion. The angular rate of vehicle 30 about the X-axis ("the ARX") is measured by sensor 16 and the measurements are communicated to controller 12. If the ARX does not exceed the Energy Criterion, an "alpha flag" is set to zero and is saved within memory 14, as shown in block 63. Otherwise, apparatus 10 computes the amount that the ARX exceeds the energy criterion, saves this value within memory 14 and proceeds to block 64, where the "alpha flag" is set to one and is saved within memory 14. It should be appreciated that the Energy Criterion is a "dynamic threshold" which compensates for the increased likelihood of a rollover when a vehicle is accelerating laterally. Particularly, the Energy Criterion or threshold is reduced based upon the value of the lateral acceleration of vehicle 30.

Apparatus 10 next calculates an ARX offset value and an ARX offset threshold value, as shown in block 66. In one non-limiting embodiment the ARX offset value is equal to the sum of the current ARX value and the amount by which the current ARX value exceeds a constant value or "offset value". In an alternate embodiment, the ARX offset value is equal to the integral, over a predetermined interval or period of time, of the ARX value minus the offset value.

Figure 5:
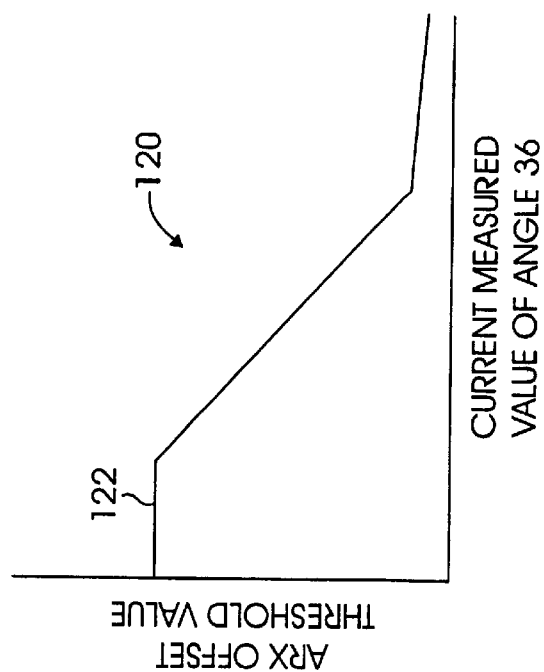
FIG. 5 is a graph of the ARX offset threshold value versus the angle of the vehicle around the X-axis.

The ARX offset threshold value is calculated by controller 12 using an angular dependent function (e.g. a function dependent on the current measured angle 36 and/or angle 38), a non-limiting example of which is illustrated within graph 120 of FIG. 5. Particularly, the curve 122 in graph 120 represents the ARX offset threshold value corresponding to the current measured angle 36.

In block 68, apparatus 10 compares the calculated ARX offset value to the calculated ARX offset threshold value. If the ARX offset value does not exceed the ARX offset threshold value, controller 12 enters block 71 where a "beta flag" is "set" to zero and is saved within memory 14. Otherwise, controller 12 proceeds to step 70 where the "beta flag" is set to one.

In block 72, controller 12 performs a "safing" or confirmation function to determine whether safety devices 22, 24 should be activated (i.e., to confirm whether vehicle 30 is relatively certain to rollover). Particularly, controller 12 filters (e.g., by way of a conventional low pass filter) or receives low pass filtered vertical acceleration values from sensor 20 and compares the current measured and filtered vertical acceleration value to a predetermined vertical acceleration threshold value stored within memory 14. If the filtered vertical acceleration value does not exceed the vertical acceleration threshold value, controller 12 enters block 73 where a "gamma flag" is "set" to zero and is saved within memory 14. Otherwise, controller 12 proceeds to step 74 where the "gamma flag" is set to one and is saved within memory 14. In the preferred embodiment, the vertical acceleration threshold value is set to a relatively low value in order to ensure that it is not the "limiting" or primary factor within the rollover detection sequence. It should be appreciated that using the vertical acceleration as a "safing" function provides an accurate detection of an actual rollover situation since levels of both longitudinal and lateral acceleration may be generally and selectively present during the ordinary operation of a vehicle (e.g., while the vehicle is turning or cornering).

In step 76, controller 12 confirms that each of the alpha, beta, and gamma flags are activated or set to one. If one or more of the flags have not been set to one, controller 12 clears or deletes the flags from memory and returns to block 54. If each flag has been set to one, a rollover situation has been determined to be imminent and/or relatively certain to occur, and controller 12 proceeds to step 78 where it generates a "rollover detection" signal and/or a safety device activation control signal. The generated signal is received by safety devices 22, 24, which are operatively engaged and/or activated in response to receipt of the generated signal from controller 12, thereby protecting the passengers from harm and/or injury.

It is understood that the various inventions are not limited to the exact construction illustrated and described above, but that these previously delineated inventions may be varied without departing from the scope of the inventions as described in the following claims.

What is claimed is:

1. An apparatus for detecting the onset of a vehicle rollover, said vehicle being disposed upon a first surface at an angle which changes at a certain rate, said apparatus comprising:
    at least one first sensor which measures lateral and vertical acceleration values and said certain rate of said vehicle, and which generates a data signal based upon said measured lateral and vertical acceleration values and said certain rate; and
    a controller which is communicatively coupled to said at least one sensor, which receives said data signal, which utilizes said data signal to estimate said angle, which compares said certain rate to a first threshold value, which calculates a second threshold value based upon said measured value of said lateral acceleration and said estimated value of said angle, which compares said certain rate to said second threshold value, which calculates an offset value, which compares said offset value to a third threshold value, which compares said measured value of said vertical acceleration to a fourth threshold value, and which detects said onset of said vehicle rollover if said first said second, said third and said fourth threshold values have been exceeded.

2. The apparatus of claim 1 further comprising at least one safety device which is selectively activated if said controller detects said onset of said vehicle rollover.

3. The apparatus of claim 2 wherein said at least one safety device comprises an air bag.

4. The apparatus of claim 2 wherein said at least one safety device comprises a seat belt pretensioning mechanism.

5. The apparatus of claim 1 wherein said controller comprises a low pass filter which is used by said controller to measure said vertical acceleration value.

6. The apparatus of claim 1 wherein said certain rate is measured around the X-axis.

7. A method for determining if a vehicle rollover is imminent, said vehicle being of the type having a safety device and being disposed upon a first surface at an angle which changes at a certain rate, said vehicle having a lateral and a vertical acceleration, said method comprising the steps of:
    providing at least one sensor assembly for measuring the value of said lateral and said vertical acceleration;
    measuring said certain rate;
    estimating the value of said angle;
    comparing said certain rate to a first threshold value;
    calculating a second threshold value based upon said measured value of said lateral acceleration and said estimated value of said angle;
    comparing said certain rate to said second threshold value;
    calculating an offset value;
    comparing said offset value to a third threshold value;
    comparing said measured value of said vertical acceleration to a fourth threshold value; and
    activating said safety device if said first, said second, said third and said fourth threshold values have been exceeded.

8. The method of claim 7 wherein said sensor assembly comprises a low pass filter for measuring said vertical acceleration value.

9. The method of claim 7 wherein said second threshold value is calculated by use of a envelope detection function.

10. The method of claim 7 wherein said offset value is calculated based upon the amount that said rate exceeds said second threshold value.

11. The method of claim 7 wherein said third threshold value is calculated by way of a function which is dependent upon said value of said angle.

12. The method of claim 7 wherein said safety device comprises an air bag.

13. The method of claim 7 wherein said safety device comprises a seat belt pretensioning mechanism.

14. A method for detecting the onset of a vehicle rollover for use in combination with a vehicle having an angular rate and a lateral acceleration value, said method comprising the steps of:
    measuring said angular rate and said lateral acceleration value;
    providing a first value;
    calculating a first threshold value by reducing said first value by an amount based upon said measured lateral acceleration value;
    comparing said measured angular rate to first threshold value;
    providing a second value;
    calculating a third value by adding said second value to said angular rate;
    comparing said third value to a second threshold; and generating at least one signal if said first threshold and said second threshold are respectively exceeded by said measured angular rate and said third value.

15. The method of claim 14 wherein said angular rate is measured around the X-axis.

16. The method of claim 14 further comprising the steps of:

provide a selectively activatable safety device; and activating said safety device if said at least one signal is generated.

17. The method of claim 16 wherein said selectively activatable safety device comprises an air bag.

18. The method of claim 17 wherein said selectively activatable safety device comprises a seat belt pretensioning mechanism.

19. The method of claim 14 further comprising the steps of measuring a vertical acceleration value of said vehicle;

comparing said measured vertical acceleration value to a third threshold; and generating a second signal if said vertical acceleration value exceeds said third threshold.

* * * * *